United States Patent [19]

Ravellat

[11] Patent Number: 5,021,631
[45] Date of Patent: Jun. 4, 1991

[54] SYSTEM FOR MARKING MOVING OBJECTS BY LASER BEAMS

[75] Inventor: Ramon S. Ravellat, Castellar Del Valles, Spain

[73] Assignee: Codilaser S.A., Barcelona, Spain

[21] Appl. No.: 534,255

[22] Filed: Jun. 7, 1990

[51] Int. Cl.[5] .............................................. B23K 26/00
[52] U.S. Cl. ............................. 219/121.68; 364/474.08
[58] Field of Search ...................... 219/121.68, 121.69, 219/121.6, 121.85; 364/474.08

[56] References Cited

U.S. PATENT DOCUMENTS

| | | | |
|---|---|---|---|
| 4,307,282 | 12/1981 | Gappa | 219/121.69 |
| 4,320,542 | 1/1983 | Mills et al. | 219/121.69 X |
| 4,323,755 | 4/1982 | Nierenberg | 219/121.69 |
| 4,652,722 | 3/1987 | Stone et al. | 219/121.76 |
| 4,740,269 | 4/1988 | Berger et al. | 219/121.69 X |
| 4,791,267 | 12/1988 | Yokoyama et al. | 219/121.69 X |
| 4,922,077 | 5/1990 | Gordon | 219/121.78 X |
| 4,945,204 | 7/1990 | Nakamura et al. | 219/121.75 X |

*Primary Examiner*—C. L. Albritton
*Attorney, Agent, or Firm*—Staas & Halsey

[57] ABSTRACT

A system for marking moving objects by laser beams, in which there is inserted in a beam path extracavity optical deflector comprising a germanium crystal and a transducer which converts radio frequency signals into sound waves which excite the crystal. There is also a series of fixed, different frequency oscillators, an electronic switch and a control unit selecting at all times one of the switches to connect at any time of the oscillators to be transducer. It allows for high speed marking.

9 Claims, 2 Drawing Sheets

SYSTEM FOR MARKING MOVING OBJECTS BY LASER BEAMS

BACKGROUND OF THE INVENTION

The invention relates to a system for marking moving objects by laser beams, comprising a source emitting laser beams along a path.

With increasing frequency, the packages or the products themselves have to be marked with data indicating a date, a lot number, an expiry date or other detail which is only known as from a particular moment in time, such as when the product has been packaged or when the product itself was prepared. This requirement relating to the time of marking prevents its prior inclusion in the label print, in the package print or, for example, in the mould for final preparation of the product.

Furthermore, the production, packaging or the like frequently proceeds at a very high rate whereby marking with conventional means would involve a very considerable loss of time.

As a result of the above circumstances, recourse has already been had to laser beams for the said marking operation, on the basis that said laser beams may produce a large amount of energy at the point of impingement. Nevertheless, the generally known systems are based on the insertion of a mask between the laser beam source and the area to be marked. A mask is a device which only allows the beams to pass through interstices defining the signs to be marked. Nevertheless, these masks provide images which are not variable in time and to be able to produce different images, it is necessary to have a plurality of masks available, the appropriate disposal of which is controlled by a stepper motor, with a long time of passage from one letter to another of about 200 milliseconds. The time of passage between letters is understood to be the time which has to elapse between one alphanumeric character and the next one for the process to be correct.

On the other hand, there is known one property of the germanium crystal making it capable of modifying its refractive index depending on the frequency of a received sound signal. To achieve these modifications, there is adapted a transducer of a highly conductive material which performs the function of adapting the germanium crystal to a sound signal, i.e., the speed of sound (5,500 m/s) within the crystal.

On application of this property is know with respect to the configuration of a laser generator. This configuration is basically as follows:

A constant wavelength photon generator means, such as a low pressure plasma tube with a gas mixture ($CO_2$, $N_2$, He), is taken and an electric field is created therein, producing a photon beam. This photon beam is guided in a cavity formed by two mirrors, one partly reflective and the other 100% reflective.

When the accumulated light energy is sufficiently high, a laser emission occurs through the partly reflective mirror.

To produce a pulsed laser beam, there is inserted within the laser cavity in the direction of the photon beam a germanium crystal with a transducer which when it is excited with a radio frequency signal causes a deviation of the photon beam path, interrupting the laser emission.

When the radio frequency signal is interrupted, the photon beam path is restored, producing a laser emission again. It should be noted that during the time the beam is interrupted there is a considerable increase of energy within the cavity, producing a high energy laser pulse when the emission is restored.

SUMMARY OF THE INVENTION

Independently of the above, it is an object of the invention take advantage of the aforesaid property of the germanium crystal, situated outside the aforesaid cavity (extracavity) for a moving objects marking system.

This object is achieved by a system which is characterized in that there is inserted in the laser beam path an extracavity optical deflector comprising a germanium crystal and a transducer adapted to convert radio frequency signals into sound waves suitable for exciting said germanium crystal, there being also a series of at least five fixed frequency oscillators, the frequency of each oscillator being different from that of the others; an electronic switch situated at the outlet of each oscillator having a switching time of less than 3 microseconds; and a control unit selecting at all times one of said switches to connect at any time one of said oscillators to said transducer.

DESCRIPTION OF THE PREFERRED EMBODIMENT

Figure 1:
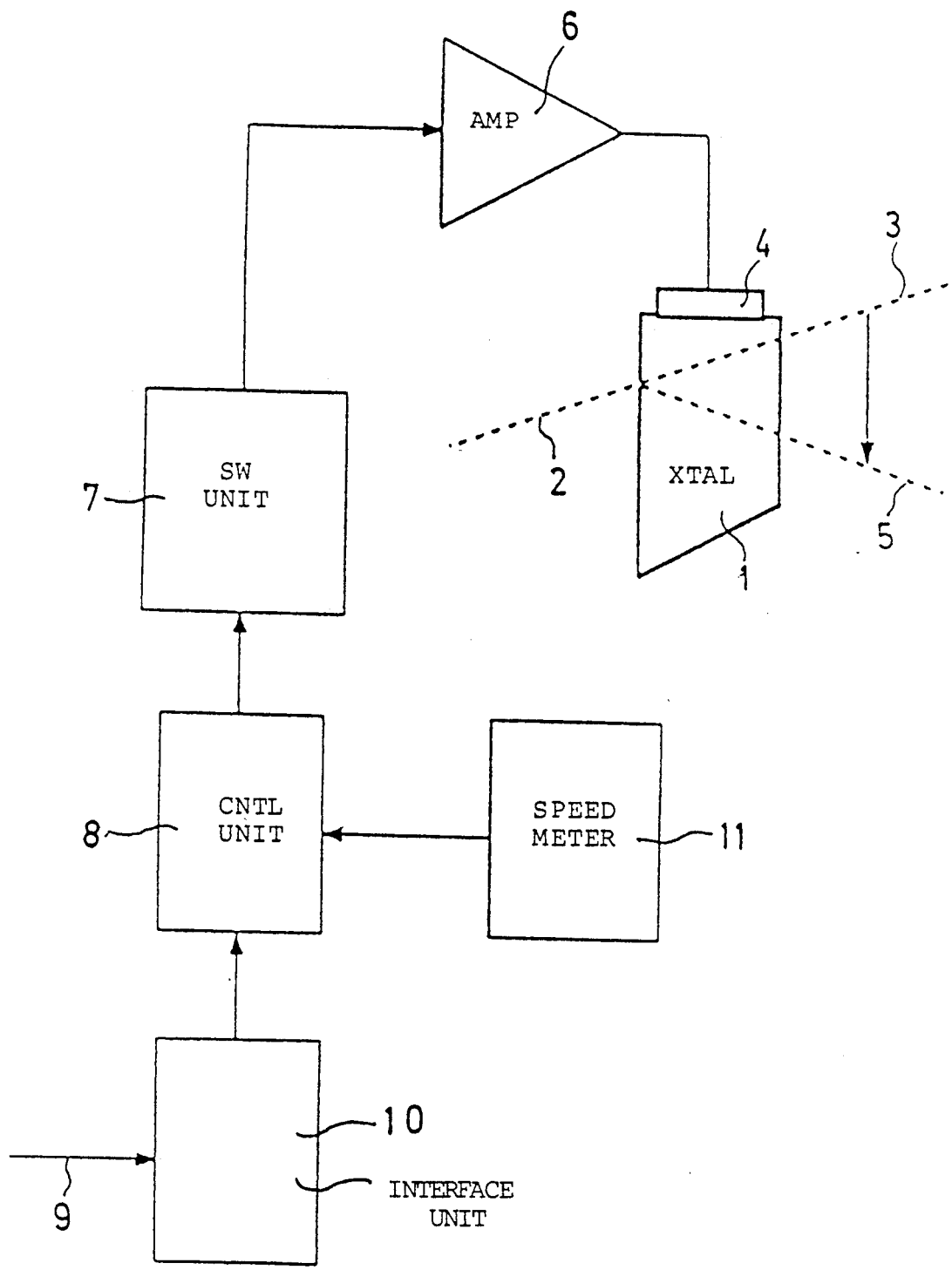
FIG. 1 is a block diagram of a preferred embodiment of the present invention.

The system to which the foregoing paragraph refers, therefore, is based on causing successive previously programmed different frequencies to reach said transducer; each different frequency produces a different refractive index in the germanium crystal and obviously, a different refraction (deflection) of the incident beams corresponds to each refractive index.

After substantial trails, it has been determined that the optimum working frequencies of the germanium crystal with its transducer are in the radio frequency band (for example 70 MHz) and it is possible to obtain a band width of 20 MHz at ±3 decibels.

As stated above, for the system of the invention, the optical deflector must be accompanied by appropriate electronic equipment allowing each of the deflections to be controlled at all times.

The electronic equipment has been designed on the basis of a series of fixed frequency oscillators, switched at high speed, whereby a frequency modulated signal is obtained and there corresponds to each of the frequencies a dot which is subsequently used to form the laser image.

By varying the switching of the different frequencies it is possible to create alphanumeric characters and any character capable of being formed by a longitudinal matrix of 20 dots, that is, at least twenty different laser dots may be obtained at focal length.

The system according to the invention provides the notable advantage over other laser marking system in that character changes may be made in a very short time (less then 1 microsecond) without limitation of characters per line.

Further to the series of fixed frequency oscillators, the electronic equipment is provided at the outlet of each oscillator with an electronic switch having a switching time of less then 2.5 microseconds. Each switch is controlled by a microprocessor (for example a 8085 microprocessor) which generates ON/OFF information depending on the dot which has to be marked at the pertinent instant.

The form used to generate characters may be that of a 5×5 dot matrix. Thereby, only five dots are generated longitudinally, i.e., in the vertical direction, it being the horizontal speed of the object to be marked which automatically originates the movement to be able to obtain the corresponding 5×5 image. There is described below in example in which the objects to be marked are integrated in a production line having speed of movement of 30 meters/minute, equivalent to 0.5 mm every millisecond. In this case, if five dots can be generated every millisecond, a character having a width of 4×0.5 mm, i.e., 2 mm, may be obtained.

To generate five dots every millisecond, the intermediate time is 1 millisecond divided by the number of dots less one, i.e., 250 microseconds. Consequently, when reading the production line speed, the electronic equipment must generate dots with an adequate time, which in this case is 250 microseconds. Said speed may be read by an encoder. It should be noted that the said time of 250 microseconds is much longer than that of the germanium crystal, which is of the order of 750 nanoseconds. The said germanium crystal time refers to the time of passing from the 0 line, i.e., absence of sound signal, to the line corresponding to the selected frequency.

It is pointed out that the excitation energy of the laser which each dot will have is 250 microseconds multiplied by the laser power. The power required depends on the material to be marked. A energy of 7.5 millijoules is required for wall or gloss paper, whereby a power of 30 laser W at 10.6 microns ($CO_2$) would be required.

A laser input line 2 impinges on the germanium crystal 1 and, in the absence of a sound signal within the crystal, it passes through it without diffraction along the line 3. If the crystal is excited with a 40 W radio frequency signal from the transducer 4, the line 2 is diffracted as by the line 5, giving a diffraction angle of 77 milliradians.

The signal inputted to the transducer flows from a linear radio frequency amplifier 6 having a 50 W output with a 600 milliwatt input, 50 ohm output impedance and a band width of ±10 MHz.

The switching unit 7 comprises a series of fixed frequency oscillators and the switches required for the generation of the frequency modulated signal.

The control unit 8 comprises a process control microprocessor, together with non volatile storage (PROM) in which the character generator is stored. The microprocessor is controlled by a programme having input-output protocols for performing the switching 9 by way of RS 232 with a not shown external computer and to be able to form the different characters to be marked, as well as performing consecutive numbering and/or date and time marking.

An interface circuit 10 is used to place the microprocessor forming part of the control unit 8 in communication with the aforesaid external computer, i.e., it acts as a peripheral of the central computer.

Finally, a speed meter 11 comprises an encoder associated with the production line on which the objects to be marked are located. It also comprises the necessary electronic equipment of converting the speed reading obtained into information suitable for the microprocessor.

Figure 2:
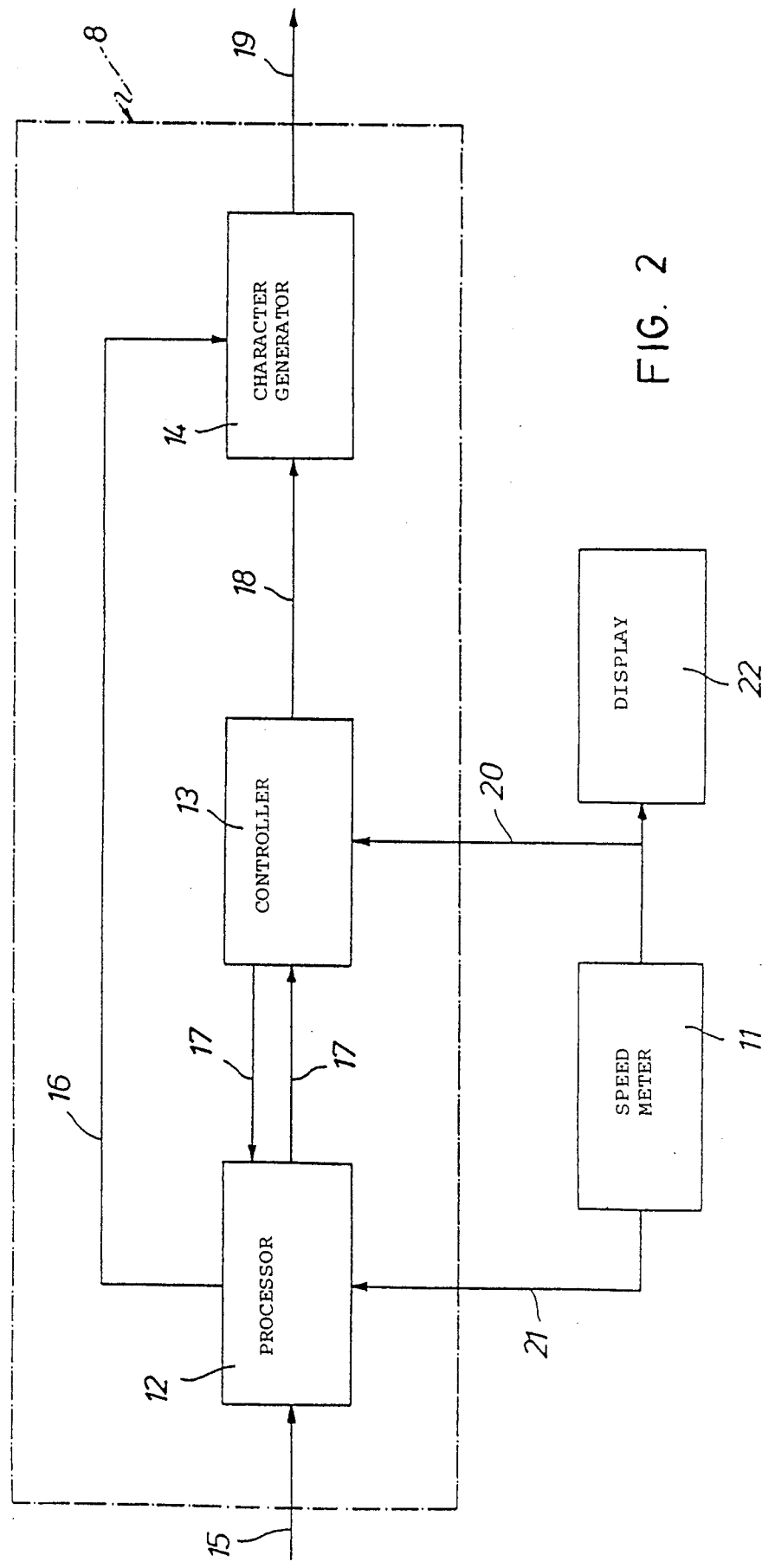
FIG. 2 is a schematic block diagram of a control unit in the FIG. 1 embodiment.

With reference to FIG. 2, it may be appreciated that the control unit 8 comprises the following subunits: a microprocessor 12, a programmable time base and control 13 and the character generator 14. The microprocessor 12, over the line 15 receives information on the configuration of the code to be marked from the external computer, not shown, via the interface 10. Such information comprises the following aspects: a) character format, b) number of printing lines and c) alphanumeric code to be marked.

With this information, the microprocessor 12 configures the subunits 13 and 14.

The line 16 is used to transmit the different alphanumeric codes to the character generator 14. The transmission is sequential and is controlled by the end of code print lines 17. The transmission is a parallel signal of n bits, i.e., it is possible to configure $2^n$ different codes.

A counter forming part of the programmable control 13 performs a sequential count; the maximum hexadecimal value of the counter and the time for which the counter is at one same value depends on the number of printing lines and the speed of the object to be marked.

The line 18 is the count output of the subunit 13. The number of information bits is the same as the minimum number of frequencies used, therefor there is a direct relationship between the code on line 18 and the code on line 16. In other words, on line 16 there is the code of the alphanumeric character to be marked which is the one processed by the non-volatile storage (PROM). At the outlet of the PROM there is a binary code indicating the switches to be accessed and those which are not, as well as the time of access or actuation of the corresponding switch, which takes place through the line 19 extending to the switching unit 7. Access is had only when the count output line 18 coincides with the corresponding bit of the code generator by the PROM.

The speed meter 11 acts in two ways. The first place, it modifies the time base of subunit 13 over the line 20 and, in the second place, it delivers a binary code of n bits over the line 21 to the microprocessor 12 for modification and correction of the general work time. The speed meter 11 may be connected to a display 22 which shows the speed of travel (i.e., in meters per minute) of the objects to be marked.

I claim:

1. A system for marking moving objects by laser beams, comprising a source emitting laser beams along a path wherein there is inserted in said path an extracavity optical deflector comprising a germanium crystal and a transducer adapted to convert radio frequency signals into sound waves suitable for exciting said germanium crystal, there being also a series of at least five fixed frequency oscillators, the frequency of each oscillator being different from that of the others; an electronic switch situated at the outlet of each oscillator having a switching time of less than 3 microseconds; and a control unit adapted to select at all times one of said switches to connect at any time one of said oscillators to said transducer.

2. The system of claim 1, wherein the frequency of each of said fixed frequency oscillators is in the radio frequency band, having a band width of 20 MHz.

3. The system of claim 1, comprising a linear radio frequency amplifier receiving the signal from the fixed frequency oscillators and transmitting it to said transducer.

4. The system of claim 3, wherein said amplifier has a 50 W output, a 600 mW input and a 50 ohm output impedance.

5. The system of claim 1, wherein said control unit comprises a microprocessor and a non volatile storage containing a character generator.

6. The system of claim 5, wherein to form the characters to be marked said microprocessor is controlled by a program having input-output protocols for performing the switching with an external computer.

7. The system of claim 6, further comprising: interface circuit means for switching the external computer circuit.

8. The system of claim 1, comprising a measuring means for measuring a speed of the moving objects to be marked.

9. The system of claim 8, in which the moving objects are conveyed by a production line, wherein said speed measured means indicates a speed of the production line.

* * * * *